(12) United States Patent
Yamamoto et al.

(10) Patent No.: US 6,459,598 B1
(45) Date of Patent: Oct. 1, 2002

(54) INVERTER DEVICE

(75) Inventors: Akihisa Yamamoto, Tokyo (JP); Kazuaki Hiyama, Tokyo (JP); Shinji Hatae, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/958,270

(22) PCT Filed: Feb. 9, 2000

(86) PCT No.: PCT/JP00/00712

§ 371 (c)(1),
(2), (4) Date: Oct. 9, 2001

(87) PCT Pub. No.: WO01/59918

PCT Pub. Date: Aug. 16, 2001

(51) Int. Cl.$^7$ ............................................... H02M 7/122
(52) U.S. Cl. .................................................... 363/56.01
(58) Field of Search ................................. 363/55, 56.01, 363/56.03, 56.04, 56.12, 131

(56) References Cited

U.S. PATENT DOCUMENTS

| | | | |
|---|---|---|---|
| 3,832,621 A | * | 8/1974 | Kornrumpf et al. ........... 363/3 |
| 3,919,621 A | * | 11/1975 | Wechsler ...................... 363/57 |
| 4,331,886 A | | 5/1982 | Perner et al. |
| 4,414,479 A | | 11/1983 | Foley |
| 5,418,707 A | * | 5/1995 | Shimer et al. ................. 363/65 |
| 5,532,712 A | * | 7/1996 | Tsuda et al. ................... 345/87 |

FOREIGN PATENT DOCUMENTS

JP  10-42575  2/1998

* cited by examiner

*Primary Examiner*—Adolf Deneke Berhane
(74) *Attorney, Agent, or Firm*—Leydig Voit & Mayer, Ltd

(57) ABSTRACT

An inverter apparatus includes an inverter circuit for driving a load. This inverter circuit has at least a pair of switching elements connected in series in a forward direction between both polarity terminals of a dc supply for supplying power to a load. An inverter drive circuit is employed for driving each switching element of the inverter circuit and has at least one high withstand voltage IC wherein the signal level reference potential is different in the input signal and the output signal. A clamping circuit clamps the potential of the low voltage side reference terminal, to which a potential, that is a reference for operation of the high withstand voltage IC in the inverter drive circuit and is a reference for a signal on the low potential side of the high withstand voltage IC, is applied. The voltage is clamped to the high voltage reference terminal to which is applied a reference potential for the high potential-side signal in the high withstand voltage IC. The inverter apparatus also includes a voltage dividing circuit for voltage dividing a voltage between the low voltage side reference terminal of the high withstand voltage IC in the inverter drive circuit and the negative electrode of the dc supply.

18 Claims, 7 Drawing Sheets

INVERTER DEVICE

TECHNICAL FIELD

The present invention relates to an inverter device, and relates more particularly to an inverter device having a circuit for preventing improper operation and voltage breakdown of a high withstand voltage IC used for drive control of a bridge circuit including switching elements driving a load.

BACKGROUND ART

As taught in Japanese Patent Laid-open Publication No. 10-42575, conventional inverter devices have a clamp diode connected between a high voltage reference terminal and low voltage reference terminal of a high withstand voltage IC used for drive controlling switching elements for handling negative surges resulting from line inductance and current variation per unit time, di/dt, when switching a switching element driving a load.

Basic technological premise of this invention, and problems therewith

FIG. 8 is a schematic circuit diagram showing connection of the above-noted clamp diode. It should be noted that FIG. 8 shows only the peripheral circuits of one exemplary high withstand voltage IC, for example, the high withstand voltage IC for switching control of switching elements driving a load connected to the external connection terminal U to which the load is connected.

Clamp diode 102 is connected between high voltage side reference terminal Vs and low voltage side reference terminal VSS of high withstand voltage IC 101; high withstand voltage IC 101 controls operation of switching element 104 connected between external power supply terminal P to which a positive supply voltage is applied, and external terminal U to which a load is connected. The high withstand voltage IC controlling operation of switching element 105 connected between external terminal U and external power supply terminal N to which a negative supply voltage is applied is omitted in this figure.

Voltage V (Vs–VSS) is held by clamp diode 102 to the forward voltage of clamp diode 102 only when a negative potential surge causes voltage V (Vs–VSS) between high voltage side reference terminal Vs and low voltage side reference terminal VSS to become a negative voltage.

However, if the impedance of the load connected to external terminal U is low, heavy current flows when the load is driven, and the negative potential surge reaches several tens of volts, a negative potential greater than or equal to the withstand voltage of the high withstand voltage IC 101. The voltage is applied because of the delay due to the normal recovery time and the V-I characteristic of clamp diode 102 when a heavy current of several hundred amperes, for example, flows. It is therefore not possible for clamp diode 102 alone to sufficiently suppress the negative voltage applied to the high withstand voltage IC 101, resulting in improper operation, and, in some cases, breakdown of high withstand voltage IC 101.

The present invention resolves the above described problem, and an object of this invention is to provide an inverter apparatus preventing breakdown and improper operation of a high withstand voltage IC that controls the switching operation of switching elements for driving a load.

DISCLOSURE OF THE INVENTION

An inverter apparatus according to the present invention includes an inverter circuit part for inverter driving a load. This inverter circuit part has at least a pair of switching elements connected in series in a forward direction between both polarity terminals of a dc supply for supplying power to a load. An inverter drive circuit part is employed for driving each switching element of the inverter circuit part and has at least one high withstand voltage IC wherein the signal level reference potential is different in the input signal and output signal. A clamping circuit part clamps the potential of the low voltage side reference terminal, to which a potential that is a reference for operation of the high withstand voltage IC in the inverter drive circuit part and is a reference for a signal on the low potential side of the high withstand voltage IC is applied, to the high voltage reference terminal to which is applied a reference potential for the high potential-side signal in the high withstand voltage IC. The inverter apparatus also includes a voltage dividing circuit part for voltage dividing a voltage between the low voltage side reference terminal of the high withstand voltage IC in the inverter drive circuit part and the negative electrode of the dc supply.

By thus providing a voltage dividing circuit part for voltage dividing a voltage between the low voltage reference terminal of the high withstand voltage IC and the negative electrode of the dc supply, a negative voltage applied between the high voltage reference terminal and the low voltage reference terminal of the high withstand voltage IC is prevented from going below the minimum rated withstand voltage of the high withstand voltage IC.

The voltage dividing circuit part can also be disposed to each high withstand voltage IC.

Preferably, the voltage dividing circuit part is an element functioning as a voltage dividing resistance connected between the low voltage side reference terminal of the high withstand voltage IC in the inverter drive circuit part and the negative electrode of the dc supply, in which case the voltage dividing circuit part is an element effecting a voltage dividing resistance, such as one resistor or one inductance.

Further preferably, the low voltage side reference terminal of the high withstand voltage IC in the inverter drive circuit part is connected by way of a diode to elements functioning as the clamping circuit part and voltage dividing resistance, and current flows from the voltage dividing resistance in the direction of the low voltage reference terminal of the high withstand voltage IC.

Yet further preferably, the bypass circuit part for bypassing the voltage dividing circuit part is disposed to each voltage dividing circuit part so that high withstand voltage IC operating current output from the low voltage reference terminal flows to the negative electrode of the dc supply.

More specifically, this bypass circuit part is a bypass diode for bypassing the voltage dividing circuit part, and the bypass circuit part comprises one bypass diode.

BEST MODE FOR CARRYING OUT THE INVENTION

The preferred embodiments of the present invention are described below with reference to the accompanying figures.

Embodiment 1

Figure 1:
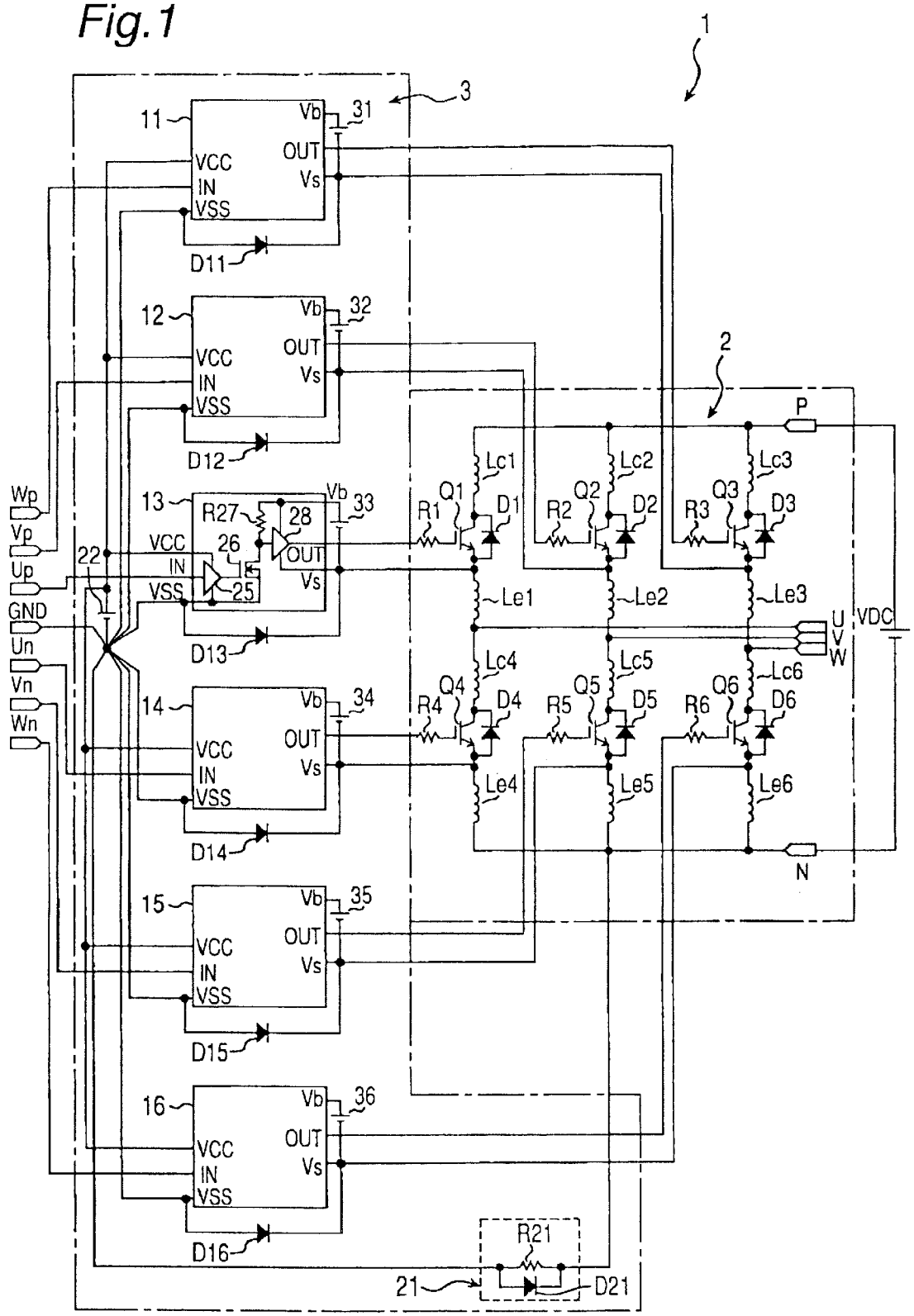
FIG. 1 is a schematic circuit diagram showing an example of an inverter apparatus according to a first embodiment of the present invention.

FIG. 1 is a schematic circuit diagram showing an example of an inverter apparatus according to a first embodiment of the present invention. It should be noted that FIG. 1 shows an example of a three-phase inverter apparatus.

In FIG. 1, three-phase inverter apparatus 1 comprises a voltage inverter 2 comprising six IGBT switching elements Q1 to Q6 and parallel connected diodes D1 to D6 corresponding to switching elements Q1 to Q6, and an inverter drive circuit 3 for driving the voltage inverter.

In voltage inverter 2, collectors of switching elements Q1 to Q3 are each connected to external power supply terminal P for applying a positive supply voltage to voltage inverter 2, at that time a corresponding line inductance Lc1 to Lc3 is formed between the collector and external power supply terminal P. Emitters of switching elements Q4 to Q6 are connected to the external power supply terminal N for applying a negative supply voltage to voltage inverter 2, at that time a corresponding line inductance Le4 to Le6 is formed between each emitter and the external power supply terminal N.

The emitter of switching element Q1 and the collector of switching element Q4 are each connected to external connection terminal U for connecting a load, and line inductance Le1 between the emitter and external connection terminal U, and line inductance Lc4 between the collector and external connection terminal U. are respectively formed. Likewise, the emitter of switching element Q2 and the collector of switching element Q5 are each connected to external connection terminal V for connecting a load, and line inductance Le2 between the emitter and external connection terminal V, and line inductance Lc5 between the collector and external connection terminal V, are respectively formed. Likewise, the emitter of switching element Q3 and the collector of switching element Q6 are each connected to external connection terminal W for connecting a load, and line inductance Le3 between the emitter and external connection terminal W, and line inductance Lc6 between the collector and external connection terminal W, are respectively formed.

In addition, the gates of switching elements Q1 to Q6 are connected to inverter drive circuit 3 by way of intervening corresponding resistors R1 to R6; inverter drive circuit 3 controls switching of switching elements Q1 to Q6 according to an input control signal. A dc supply VDC is connected between external power supply terminal P and external power supply terminal N, and a reactor (not shown in the figures) is connected as a load to external connection terminals U, V, W.

High withstand voltage ICs 11 to 16 for driving switching elements Q1 to Q6 are disposed in inverter drive circuit 3 for each switching element Q1 to Q6 of the voltage inverter 2, and a clamp diode D11 to D16 is disposed between the high voltage side reference terminal Vs and low voltage side reference terminal VSS of each high withstand voltage IC 11 to 16 so that the direction from low voltage side reference terminal VSS to high voltage side reference terminal Vs is forward. The low voltage side reference terminal VSS of each high withstand voltage IC 11 to 16 is connected by way of intervening protection circuit 21, comprising voltage-dividing resistance R21 and bypass diode D21 parallel connected to voltage-dividing resistance R21, to external power supply terminal N and to external ground terminal GND.

Control signal input terminal IN of each high withstand voltage IC 11 to 16 is respectively connected to a corresponding external control signal input terminal Up, Vp, Wp, Un, Vn, Wn, and positive supply input terminal VCC and low voltage side reference terminal VSS functioning as the negative supply input terminal are respectively connected to the positive and negative electrodes of dc supply 22.

It should be noted that because high withstand voltage ICs 11 to 16 all have the same circuit configuration, the internal circuitry of only high withstand voltage IC 13 is shown in FIG. 1, and the internal circuitry of high withstand voltage ICs 11, 12, and 14 to 16 is omitted. As a result, the operation of high withstand voltage IC 13 is described below, and further description of the operation of the other high withstand voltage ICs is omitted because their operation is the same as that of high withstand voltage IC 13.

High withstand voltage IC 13 comprises an input buffer 25, n-channel MOS transistor (referred to below as "NMOS transistor") 26, resistor R27, and driver circuit 28. The input terminal of input buffer 25 is connected to control signal input terminal IN, the output terminal is connected to the gate of NMOS transistor 26, the positive supply input terminal is connected to positive-supply input terminal VCC, and the negative supply input terminal is connected to low voltage side reference terminal VSS.

The drain of NMOS transistor 26 is connected to resistor R27 and the input terminal of driver circuit 28, and the source of NMOS transistor 26 is connected to low voltage side reference terminal VSS. NMOS transistor 26 and resistor R27 form a level shifter 29 for shifting the output signal of input buffer 25 to generate a signal of a floating potential floating from the potential of the output signal. In driver circuit 28 the output terminal is connected to output terminal OUT of high withstand voltage IC 13, the positive supply input terminal is connected to positive floating supply input terminal Vb, and the negative supply input terminal is connected to high voltage side reference terminal Vs functioning as the negative floating supply input terminal. The input buffer 25, driver circuit 28, and level shifter 29 thus form a level shifting circuit. In addition, a corresponding dc source 31 to 36 is connected between positive floating supply input terminal Vb and high voltage side reference terminal Vs in each high withstand voltage IC 11 to 16.

Thus comprised, the operation of protection circuit 21 is described below with reference to FIG. 2, FIG. 2 being a circuit diagram showing the peripheral circuits to high withstand voltage IC 13 in FIG. 1. It should be noted that the line inductances are omitted in FIG. 2. A reactor as a load is connected to external connection terminals U to W; the negative potential surge (referred to below as "negative surge") caused between external connection terminal U and external power supply terminal N as a result of switching switching element Q1, for example, is voltage divided by voltage-dividing resistance R21 and clamp diode D13 of protection circuit 21.

When the resistance of voltage-dividing resistance R21 is high, operating current I1 of high withstand voltage IC 13 flowing from low voltage side reference terminal VSS to external power supply terminal N is limited by resistance R21, and operating current I1 bypass flows through bypass diode D21 parallel connected to resistance R21. It will be obvious that if the resistance of voltage-dividing resistance R21 is low enough that it has no problem-causing effect on operating current I1, bypass diode D21 can be omitted.

Figure 2:
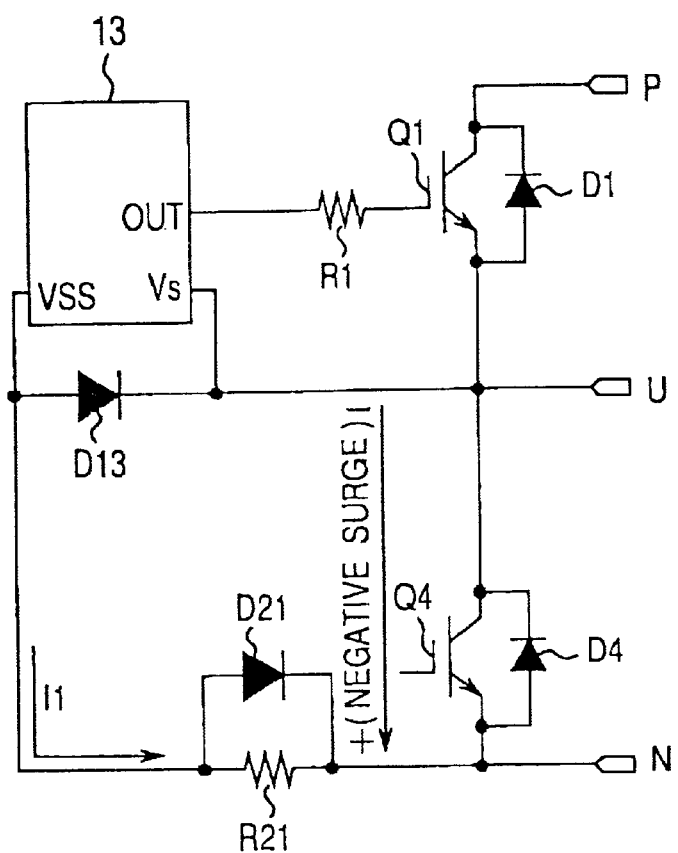
FIG. 2 is a circuit diagram showing the peripheral circuits of a high withstand voltage IC of FIG. 10.
Figure 3:
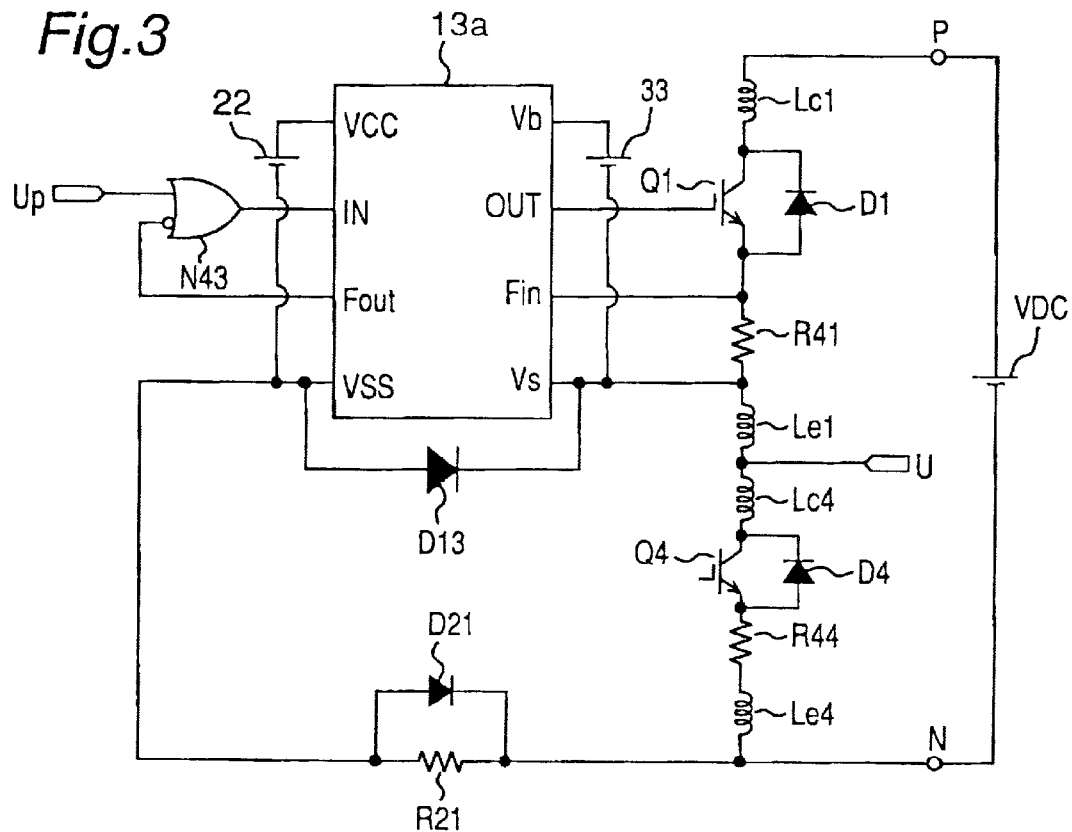
FIG. 3 is a schematic circuit diagram showing another example of an inverter apparatus according to a first embodiment of the present invention.
Figure 4:
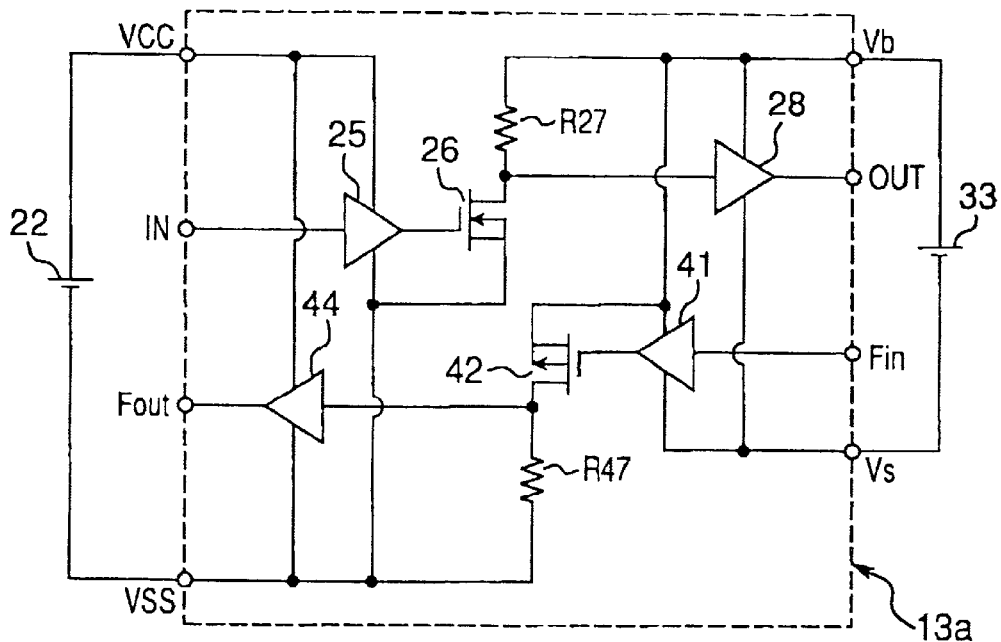
FIG. 4 shows a circuit example of a high withstand voltage IC shown in FIG. 3.

It should be noted that a high withstand voltage IC for driving switching elements Q1 to Q6 is described by way of example with reference to FIG. 1 and FIG. 2, but the invention shall not be so limited and can be applied to a high withstand voltage IC used for switching element drive control. For example, the invention can be applied to a level shift circuit for driving a switching element, and a high withstand voltage IC comprising a level shift circuit functioning as an overcurrent detection circuit for detecting overcurrent flow to a switching element. FIG. 3 shows another example of an inverter apparatus according to this first embodiment in this case, and FIG. 4 shows an exemplary circuit for the high withstand voltage IC shown in FIG. 3.

It should be noted that FIG. 3 shows an example of the high withstand voltage IC connected to switching element Q1 of inverter apparatus 1 shown in FIG. 1 and peripheral circuitry, and other high withstand voltage ICs and peripheral circuits are omitted because they are the same. Furthermore, in FIG. 3 and FIG. 4 like parts are identified by the same reference numerals shown in FIG. 1, and further description thereof is omitted below where only the differences from FIG. 1 are described.

Differences between FIG. 3 and FIG. 1 are that the emitters of switching elements Q1 to Q3 are connected to corresponding external connection terminals U to W by way of intervening current detection resistors R41 to R43, and the emitters of switching elements Q4 to Q6 are connected to external power supply terminal N by way of intervening current detection resistors R44 to R46, the internal circuits of high withstand voltage ICs 11 to 16 in FIG. 1 are changed, and NOR gates N41 to N46 are added.

In FIG. 3, one input terminal to NOR gates N41 to N46 is an inverting input terminal for inverting the input signal level, and the other input terminal is a non-inverting input terminal that does not invert the input signal level. The control signal input terminals IN of high withstand voltage ICs 11a to 16a are connected to the output terminal of corresponding NOR gates N41 to N46, and the non-inverting input terminals of NOR gates N41 to N46 are respectively connected to corresponding external control signal input terminals Up, Vp, Wp, Un, Vn, Wn.

The node between the emitter of each switching element Q1 to Q6 and the corresponding resistor R41 to R46 is connected to input terminal Fin of high withstand voltage ICs 11a to 16a, and the corresponding output terminal Fout of high withstand voltage ICs 11a to 16a is connected to the inverting input terminal of the corresponding NOR gate N41 to N46.

The operation of high withstand voltage IC 13a is described below using FIG. 4, and because operation of the other high withstand voltage ICs 11a, 12a, and 14a to 16a is the same as high withstand voltage IC 13a, further description thereof is omitted below.

High withstand voltage IC 13a comprises input buffers 25 and 41, NMOS transistor 26, p-channel MOS transistor (referred to below as "PMOS transistor") 42, resistors R27 and R47, and driver circuits 28 and 44. In input buffer 41 the input terminal is connected to input terminal Fin, the output terminal is connected to the gate of PMOS transistor 42, the positive supply input terminal is connected to positive floating supply input terminal Vb, and the negative supply input terminal is connected to high voltage side reference terminal Vs.

The drain of PMOS transistor 42 is connected to resistor R47 and the input terminal of driver circuit 44, and the source of PMOS transistor 42 is connected to positive floating supply input terminal Vb. PMOS transistor 42 and resistor R47 form level shifter 49 for down shifting the output signal from input buffer 41 and generating a signal of a potential referenced to the ground level. In driver circuit 44 the output terminal is connected to output terminal Fout of high withstand voltage IC 13a, the positive supply input terminal is connected to positive supply input terminal VCC, and the negative supply input terminal is connected to low voltage side reference terminal VSS. The input buffer 25, driver circuit 28, and level shifter 29 thus form a level shift circuit for shifting the input signal level up, and input buffer 41, driver circuit 44, and level shifter 49 form a level shift circuit for shifting the input signal level down.

Thus comprised, high withstand voltage IC 13a drives switching element Q1 according to a control signal input from external control signal input terminal Up through NOR gate 43 to the corresponding control signal input terminal IN, and from the voltage obtained from resistor R41 detects an overcurrent flowing to switching element Q1. If an overcurrent flows to switching element Q1, a high level signal is input to input terminal Fin of high withstand voltage IC 13a, and high withstand voltage IC 13a outputs a low level signal from output terminal Fout while this high level signal is input.

When a low level signal is input to the inverting input terminal of NOR gate N43, the output terminal goes high regardless of control signal input from external control signal input terminal Up, the output terminal OUT of high withstand voltage IC 13a goes low, and switching element Q1 switches off. It should be noted that connection of clamp diodes D11 to D16 and protection circuit 21 to high withstand voltage ICs 11a to 16a is the same as in high withstand voltage IC 11 to 16 in FIG. 1, and further description thereof is thus omitted.

An inverter apparatus according to a first embodiment of the present invention thus has a protection circuit 21 comprising bypass diode D21 parallel connected to a voltage-dividing resistance R21 disposed between low voltage side reference terminal VSS of the high withstand voltage IC and external power supply terminal N for applying a negative supply voltage to voltage inverter 2. It is therefore possible by adding a simple circuit to prevent a negative voltage applied between the high voltage side reference terminal Vs and low voltage side reference terminal VSS of each high withstand voltage IC from dropping below the minimum rated withstand voltage between the terminals due to a negative surge produced when switching a switching element, and it is therefore possible to inexpensively prevent improper operation and withstand voltage breakdown of the high withstand voltage IC.

Embodiment 2

One protection circuit 21 protects against breakdown of each high withstand voltage IC due to a negative surge in the above-described first embodiment, but a protection circuit 21 can be disposed to each high withstand voltage IC, and a configuration of this type is described next as a second embodiment of the present invention.

Figure 5:
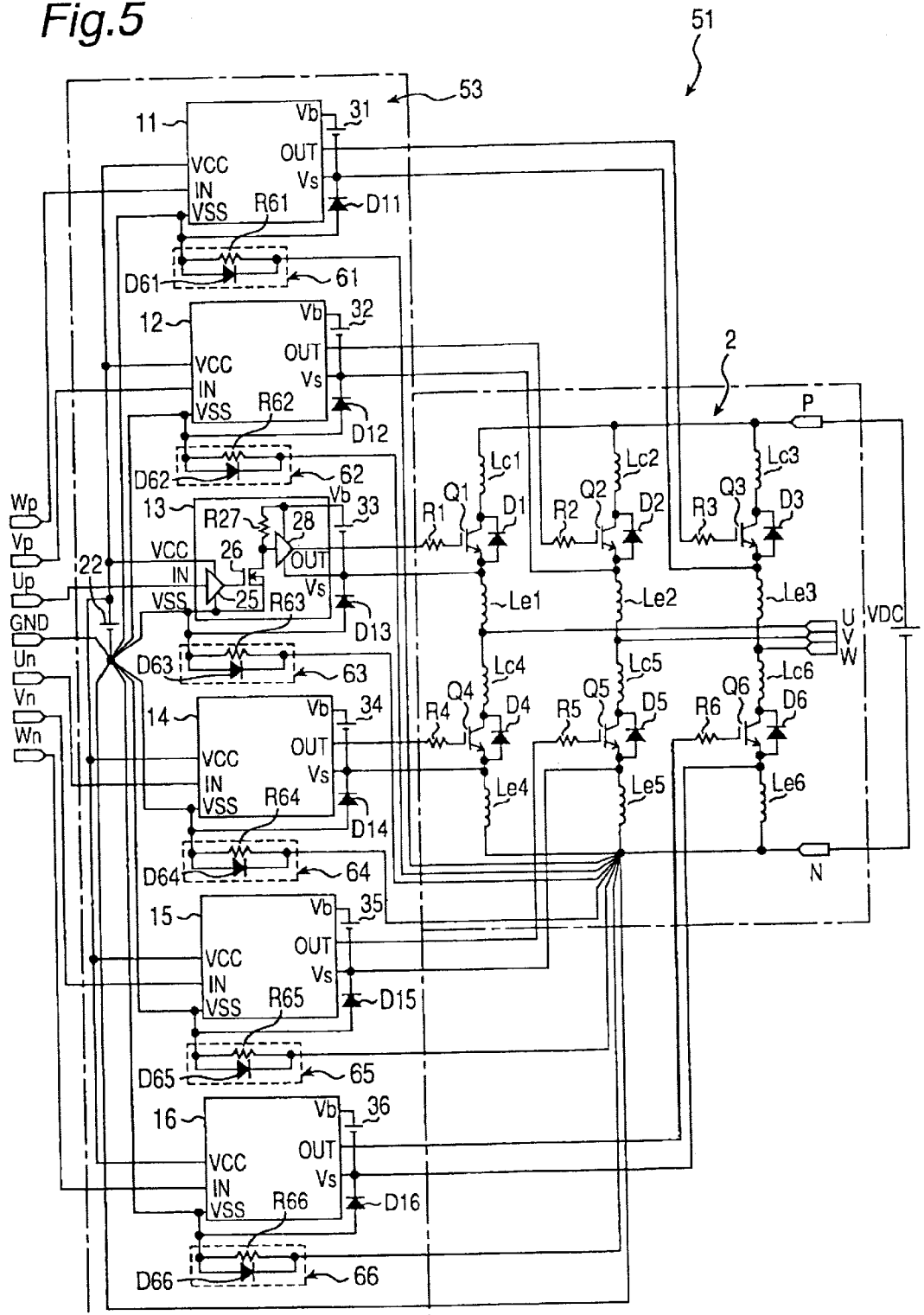
FIG. 5 is a schematic circuit diagram showing an example of an inverter apparatus according to a second embodiment of the present invention.

FIG. 5 is a schematic circuit diagram showing an inverter apparatus according to a second embodiment of the present invention. It should be noted that like parts are identified by like reference numerals in FIG. 5 and FIG. 1. Further description thereof is thus omitted here, and only the differences therebetween are described.

The differences in FIG. 5 and FIG. 1 are that in place of protection circuit 21 in FIG. 1 protection circuits 61 to 66, each comprising a bypass diode and parallel connected voltage-dividing resistor, are disposed to high withstand voltage IC 11 to 16, respectively. As a result, inverter drive circuit 3 in FIG. 1 is referred to as inverter drive circuit 53, and inverter apparatus 1 in FIG. 1 is inverter apparatus 51.

In FIG. 5 inverter apparatus 51 comprises voltage inverter 2 and inverter drive circuit 53. Inverter drive circuit 53 comprises high withstand voltage ICs 11 to 16, clamp diodes D11 to D16, dc supplies 22 and 31 to 36, and protection circuits 61 to 66.

Each protection circuit 61 to 66 is a circuit having a voltage-dividing resistor and parallel connected bypass diode, and in each protection circuit 61 to 66 a corresponding voltage dividing resistor R61 to R66 is parallel connected to a corresponding bypass diode D61 to D66. As a result, because each protection circuit 61 to 66 has the same circuit configuration, the operation of protection circuit 63 is described below, and the operation of protection circuits 61, 62, and 64 to 66 is not described because it is the same as protection circuit 63.

Protection circuit 63 is connected between low voltage side reference terminal VSS and external power supply terminal N of high withstand voltage IC 13; more specifically, the node between voltage dividing resistor R63 and the anode of bypass diode D63 is connected to low voltage side reference terminal VSS of high withstand voltage IC 13, and the node between voltage dividing resistor R63 and bypass diode D63 is connected to external power supply terminal N.

Thus comprised, a reactor constituting a load is connected to external connection terminals U to W, and a negative surge caused between external connection terminal U and external power supply terminal N as a result of switching switching element Q1, for example, is voltage divided by resistance R63 and clamp diode D13 of protection circuit 63. It should be noted that a circuit diagram excerpting the peripheral circuits of high withstand voltage IC 13 in FIG. 5 is the same as that shown in FIG. 2 except that protection circuit 21 is replaced by protection circuit 63, and is described below referring to FIG. 2 and substituting protection circuit 63 for protection circuit 21.

When the resistance of resistance R63 is high, operating current I1 of high withstand voltage IC 13 flowing from low voltage side reference terminal VSS to external power supply terminal N is limited by resistance R63, and operating current I1 bypass flows through bypass diode D63 parallel connected to resistance R63. It will be obvious that if the resistance of voltage-dividing resistance R63 is low enough that it has no problem-causing effect on operating current I1, bypass diode D63 can be omitted.

A corresponding protection circuit 61 to 66 is connected between each low voltage side reference terminal VSS and external power supply terminal N of high withstand voltage ICs 11 to 16, and a closed loop to the ground line is formed by adding voltage-dividing resistance R61 to R66 in protection circuits 61 to 66. Because this closed loop is related to improper operation of the high withstand voltage IC in some cases, a corresponding diode D71 to D76 can be connected as shown in FIG. 6 between the nodes between clamp diodes D11 to D16 and protection circuits 61 to 66, and the low voltage side reference terminal VSS of the corresponding high withstand voltage IC 11 to 16.

Figure 6:
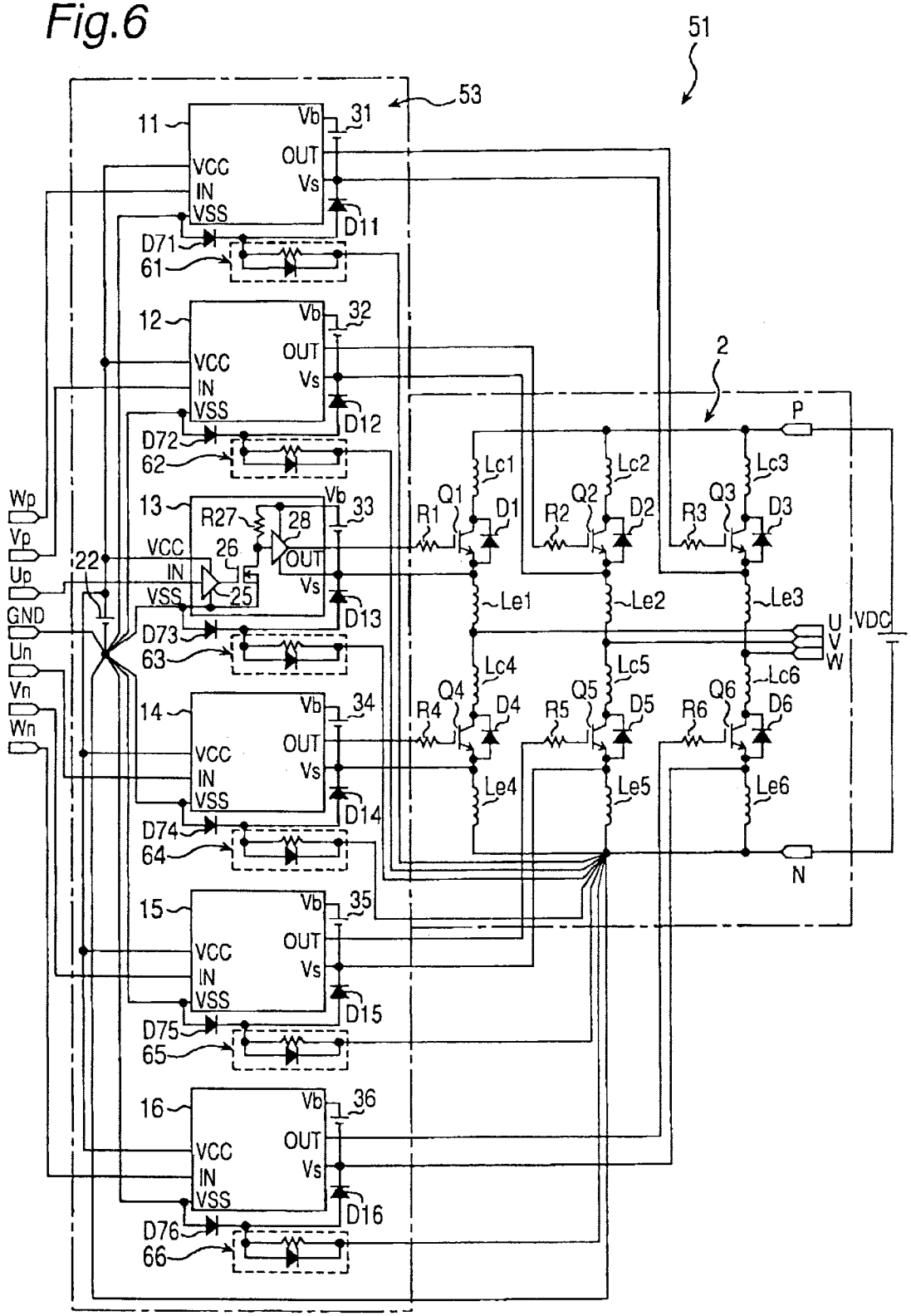
FIG. 6 is a schematic circuit diagram showing another example of an inverter apparatus according to the second embodiment of the present invention.

Using high withstand voltage IC 13 by way of example in FIG. 6, the anode of diode 73 is connected to low voltage side reference terminal VSS of high withstand voltage IC 13, and the cathode of diode 73 is connected to the anode of clamp diode D13 and the node between voltage dividing resistor R63 and the anode of bypass diode D63. When thus comprised, formation of a closed loop from external-power supply terminal N through low voltage side reference terminal VSS to external power supply terminal N can be prevented, voltage fluctuation in low voltage side reference terminal VSS of high withstand voltage IC 13 resulting from a closed loop can be prevented, and improper operation of high withstand voltage IC 13 can be prevented. It should be noted that the other high withstand voltage ICs 11, 12, and 14 to 16 are the same, and description thereof is omitted.

Figure 7:
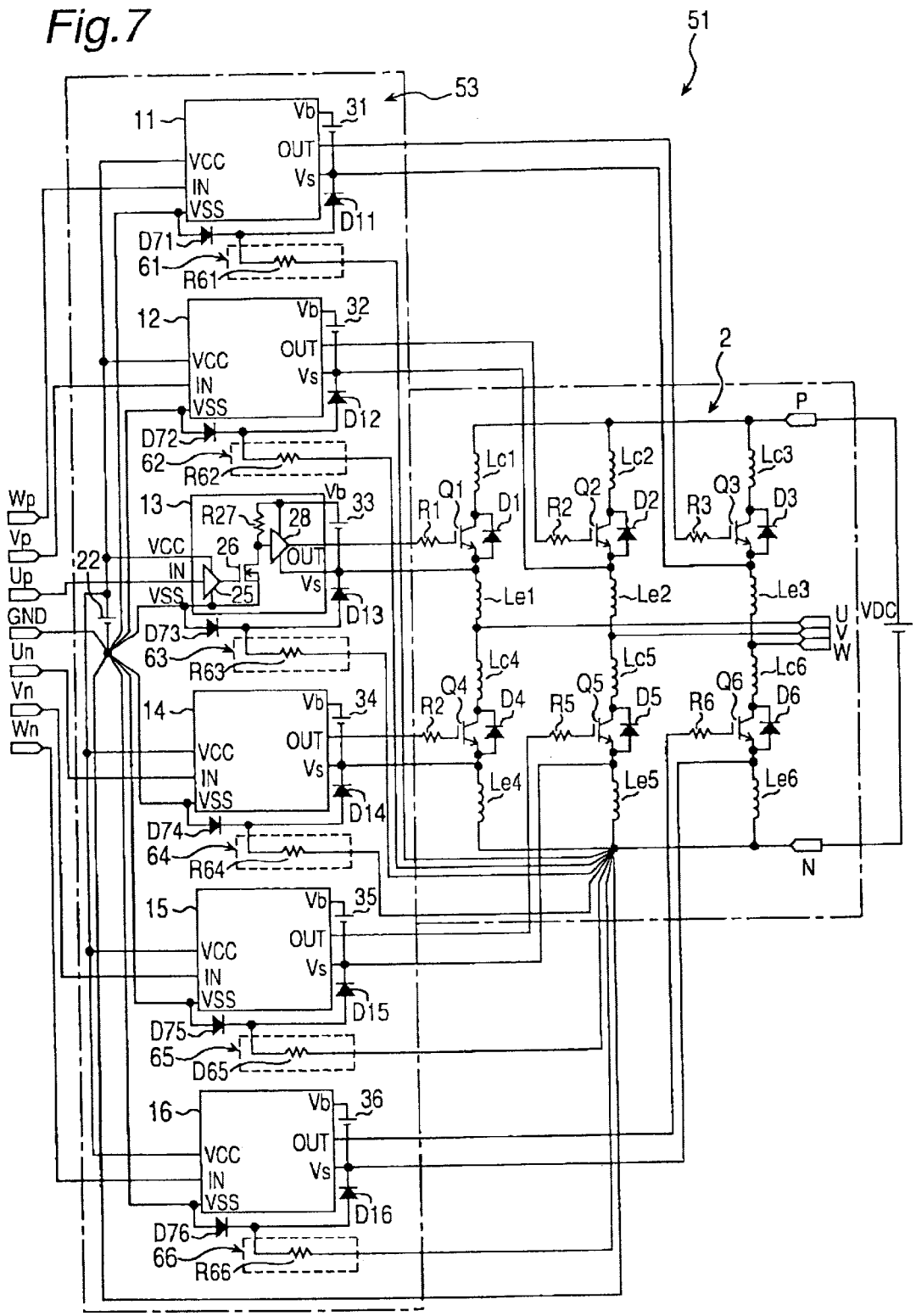
FIG. 7 is a schematic circuit diagram showing another example of an inverter apparatus according to the second embodiment of the present invention.
Figure 8:
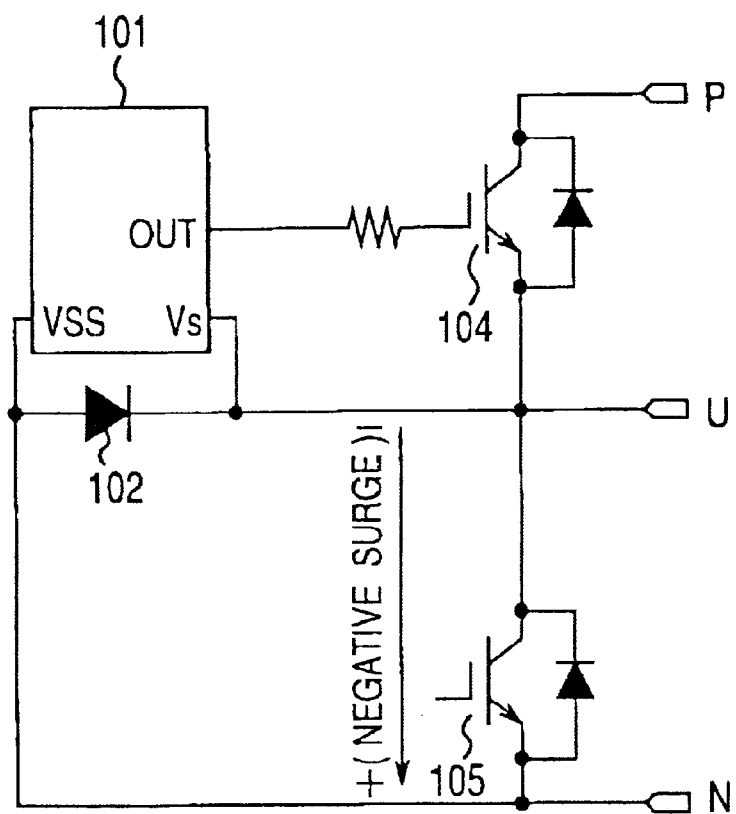
FIG. 8 is a partial circuit diagram showing an example of a conventional inverter apparatus.

Furthermore, depending upon the resistance of voltage-dividing resistance R61 to R66, that is, if the resistance of voltage-dividing resistance R61 to R66 is low enough so that it has no problem-causing effect on operating current I1 flowing from low voltage side reference terminal VSS to external power supply terminal N, bypass diodes D61 to D66 can be omitted as shown in FIG. 7.

Furthermore, it should be noted that this second embodiment is described using by way of example a high withstand voltage IC for driving switching elements Q1 to Q6, but as described in the first embodiment above the invention can be applied to a high withstand voltage IC used for switching element drive control, for example, a level shift circuit for driving a switching element and a high withstand voltage IC comprising a level shift circuit functioning as an overcurrent detection circuit for detecting overcurrent flow to a switching element.

As described above, an inverter apparatus according to a second embodiment of this invention disposes protection circuits 61 to 66 each having a parallel connected voltage dividing resistance and bypass diode between low voltage side reference terminal VSS of each high withstand voltage IC 11 to 16 and external power supply terminal N for applying a negative supply voltage to the voltage inverter 2. It is therefore possible to prevent a negative voltage applied between the high voltage side reference terminal Vs and low voltage side reference terminal VSS of each high withstand voltage IC from dropping below the minimum rated withstand voltage between the terminals due to a negative surge produced when switching a switching element, and it is therefore possible to reliably prevent improper operation and withstand voltage breakdown of the high withstand voltage IC.

It should be noted that a case in which a resistor is used for the voltage-dividing resistance of the protection circuit is used in the above first and second embodiments, but the invention shall not be so limited and an inductance or other element effecting a voltage dividing resistance can be used. Furthermore, the above first and second embodiments have been described using a three-phase inverter apparatus by way of example, but the invention shall not be so limited and can obviously be applied to a single-phase inverter apparatus.

Industrial Applicability

By adding a protection circuit of a simple configuration, the present invention can provide an inverter apparatus capable of preventing withstand voltage breakdown and improper operation of a high withstand voltage IC used for switching element drive control as a result of a negative surge produced when switching a switching element of the inverter.

What is claimed is:

1. An inverter apparatus comprising:
    an inverter circuit for driving a load, said inverter circuit having at least a pair of switching elements connected in series in a forward direction between both polarity terminals of a dc supply, for supplying power to a load;
    an inverter drive circuit for driving each switching element of the inverter circuit, said inverter drive circuit having at least one high withstand voltage IC wherein the signal level reference potential is different from the input signal and the output signal;
    a clamping circuit for clamping the high withstand voltage potential of a low voltage side reference terminal, to which a potential that is a reference for operation of the high withstand voltage IC in the inverter drive circuit and is the reference for a signal on a low potential side of the high withstand voltage IC, is applied, to a high voltage reference terminal, to which is applied a reference potential for a high potential side of the high withstand voltage IC; and
    a voltage dividing circuit for dividing a voltage between the low voltage side reference terminal of the high withstand voltage IC in the inverter drive circuit, and a negative electrode of the dc supply.

2. The inverter apparatus according to claim 1, further comprising a bypass circuit for each voltage dividing circuit for bypassing the voltage dividing circuit so that a high withstand voltage IC operating current output from the low voltage side reference terminal flows to the negative electrode of the dc supply.

3. The inverter apparatus according to claim 2, in which the bypass circuit includes a bypass diode for bypassing the voltage dividing circuit.

4. The inverter apparatus according to claim 1, in which the voltage dividing circuit functions as a voltage dividing resistance connected between the low voltage side reference terminal of the high withstand voltage IC in the inverter drive circuit and the negative electrode of the dc supply.

5. The inverter apparatus according to claim 4, further comprising a bypass circuit for each voltage dividing circuit for bypassing the voltage dividing circuit so that a high withstand voltage IC operating current output from the low voltage side reference terminal flows to the negative electrode of the dc supply.

6. The inverter apparatus according to claim 5, in which the bypass circuit includes a bypass diode for bypassing the voltage dividing circuit.

7. The inverter apparatus according to claim 4, including a diode connecting the low voltage side reference terminal of the high withstand voltage IC in the inverter drive circuit to elements functioning as the clamping circuit and voltage dividing resistance.

8. The inverter apparatus according to claim 7, further comprising a bypass circuit for each voltage dividing circuit for bypassing the voltage dividing circuit so that a high withstand voltage IC operating current output from the low voltage side reference terminal flows to the negative electrode of the dc supply.

9. The inverter apparatus according to claim 8, in which the bypass circuit includes a bypass diode for bypassing the voltage dividing circuit.

10. The inverter apparatus according to claim 1, including a voltage dividing circuit for each high withstand voltage IC.

11. The inverter apparatus according to claim 10, further comprising a bypass circuit for each voltage dividing circuit for bypassing the voltage dividing circuit so that a high withstand voltage IC operating current output from the low voltage side reference terminal flows to the negative electrode of the dc supply.

12. The inverter apparatus according to claim 11, in which the bypass circuit includes a bypass diode for bypassing the voltage dividing circuit.

13. The inverter apparatus according to claim 10, in which the voltage dividing circuit functions as a voltage dividing resistance connected between the low voltage side reference terminal of the high withstand voltage IC in the inverter drive circuit and the negative electrode of the dc supply.

14. The inverter apparatus according to claim 13, further comprising a bypass circuit for each voltage dividing circuit for bypassing the voltage dividing circuit so that a high withstand voltage IC operating current output from the low voltage side reference terminal flows to the negative electrode of the dc supply.

15. The inverter apparatus according to claim, 14, in which the bypass circuit includes a bypass diode for bypassing the voltage dividing circuit.

16. The inverter apparatus according to claim 13, including a diode connecting the low voltage side reference terminal of the high withstand voltage IC in the inverter drive circuit to elements functioning as the clamping circuit and voltage dividing resistance.

17. The inverter apparatus according to claim 16, further comprising a bypass circuit for each voltage dividing circuit for bypassing the voltage dividing circuit so that a high withstand voltage IC operating current output from the low voltage side reference terminal flows to the negative electrode of the dc supply.

18. The inverter apparatus according to claim 17, in which the bypass circuit includes a bypass diode for bypassing the voltage dividing circuit.

* * * * *